United States Patent

Tian et al.

(10) Patent No.: US 8,803,547 B2
(45) Date of Patent: Aug. 12, 2014

(54) TEST BOARD AND METHOD FOR TESTING ROTATION SPEED OF FAN

(75) Inventors: Bo Tian, Shenzhen (CN); Kang Wu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 218 days.

(21) Appl. No.: 13/476,036

(22) Filed: May 21, 2012

(65) Prior Publication Data

US 2012/0313662 A1 Dec. 13, 2012

(30) Foreign Application Priority Data

Jun. 8, 2011 (CN) .......................... 2011 1 0151960

(51) Int. Cl.
*G01R 31/34* (2006.01)
(52) U.S. Cl.
USPC .............. 324/765.01; 318/400.3; 318/400.13; 318/472; 318/500; 700/304
(58) Field of Classification Search
CPC ....................................................... G05B 13/00
USPC ...................... 324/765.01; 700/304
See application file for complete search history.

(56) References Cited

U.S. PATENT DOCUMENTS

| | | | |
|---|---|---|---|
| 7,132,809 B1* | 11/2006 | Chang ...................... | 318/400.13 |
| 7,305,316 B2* | 12/2007 | Frankel et al. ................. | 702/99 |
| 7,495,407 B2* | 2/2009 | Huang et al. .................. | 318/599 |
| 2007/0098374 A1* | 5/2007 | Fujiwara ....................... | 388/811 |
| 2009/0121667 A1* | 5/2009 | Zametzky ..................... | 318/434 |
| 2010/0289438 A1* | 11/2010 | Fan Chiang et al. ........ | 318/400.3 |
| 2012/0017856 A1* | 1/2012 | Nicgorski ................. | 123/41.11 |
| 2012/0081056 A1* | 4/2012 | Tian et al. ..................... | 318/472 |
| 2013/0151011 A1* | 6/2013 | Shih .............................. | 700/275 |
| 2014/0042947 A1* | 2/2014 | Wu ............................... | 318/500 |

* cited by examiner

*Primary Examiner* — Benjamin M Baldridge
(74) *Attorney, Agent, or Firm* — Novak Druce Connolly Bove + Quigg LLP

(57) ABSTRACT

A method for testing rotation speed of a fan receives a duty cycle ratio related to the fan sent from a dial switch on a test board connected to the fan. The method transmits a pulse width modulation (PWM) signal based on the duty cycle to the fan to power rotation of the fan, then detects the PWM signal transmitted to the fan and a tachometer (TACH) signal transmitted from the fan. The method gathers the duty cycle ratio related to the fan from the PWM signal and an actual rotation speed of the fan from the TACH signal, and displays the duty cycle ratio and the actual rotation speed together on the test board.

12 Claims, 3 Drawing Sheets

TEST BOARD AND METHOD FOR TESTING ROTATION SPEED OF FAN

BACKGROUND

1. Technical Field

Embodiments of the present disclosure generally relate to test technology, and more particularly to a test board and a method for testing rotation speed of a fan.

2. Description of Related Art

When testing rotation speed of a fan connected to a test board, a controller of the test board transmits a pulse width modulation (PWM) signal to the fan to control rotation of the fan. Then the fan transmits a tachometer (TACH) signal to the controller, and the controller analyzes the TACH signal to obtain information in relation to the rotation speed of the fan. However, a program is needed to read the information in relation to the rotation speed received by the controller, and convert the information into figures and display the figures to users on a display device. In such a manner, users cannot see test result (the rotation speed) directly on the test board.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in hardware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
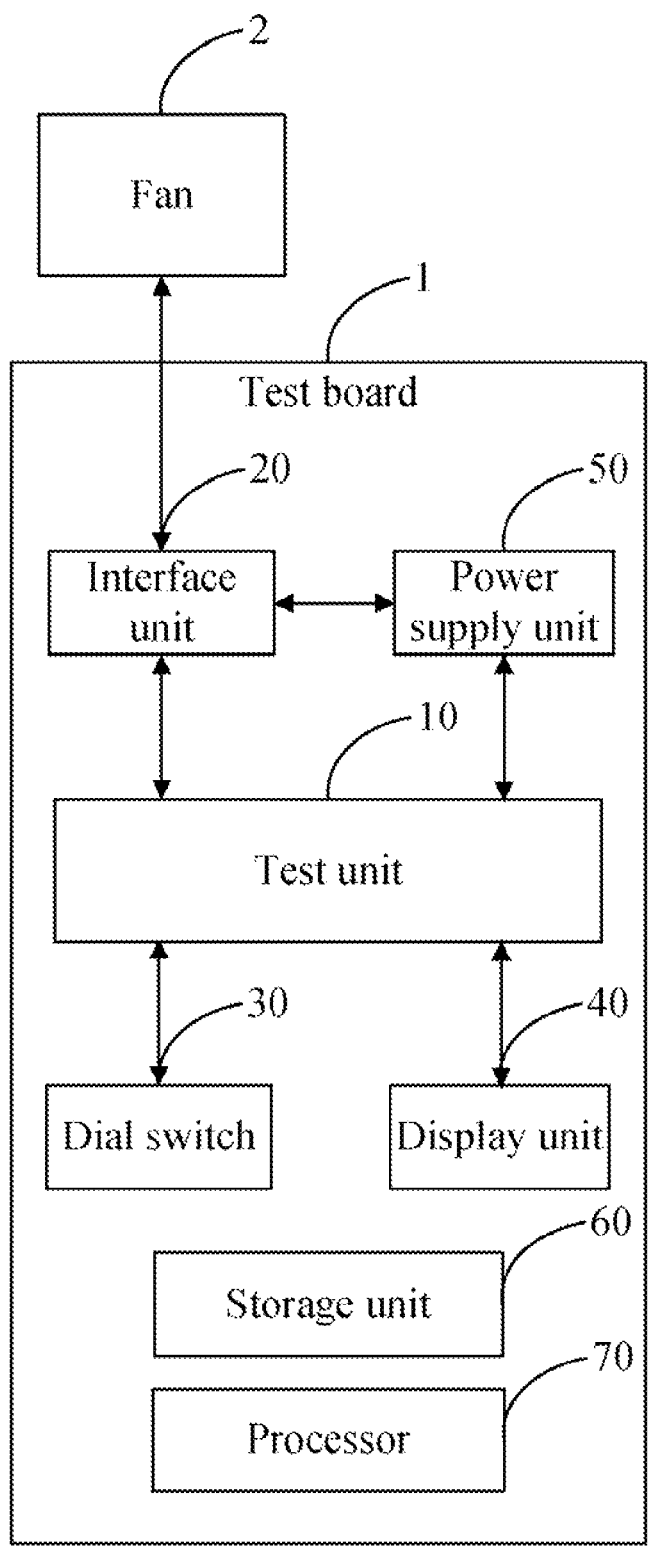
FIG. 1 is a block diagram of one embodiment of a test board including a test unit for testing rotation speed of a fan.

FIG. 1 is a block diagram of one embodiment of a test board 1 including a test unit 10 for testing rotation speed of a fan 2. The test board 1 further includes an interface unit 20, a dial switch 30, a display unit 40, a power supply unit 50, a storage unit 60, and a processor 70. The test board 1 is connected to the fan 2 via the interface unit 20.

In the embodiment, the interface unit 20 integrates many types of ports, for example, "3-pin" ports, "4-pin" ports, and "5-pin" ports. With the interface unit 20, the test unit 10 transmits a pulse width modulation (PWM) signal to the fan 2, and the fan 2 transmits a tachometer (TACH) signal to the test unit 10. In the embodiment, the fan 2 may include a Hall sensor or an emitter/receiver (not shown in the FIG. 1), operable to transmit the TACH signal to the test unit 10. The PWM signal is based on a particular duty cycle related to the fan 2. The duty cycle is a ratio of a duration of the power-on state relative to the whole cycle of the PWM signal. For example, if the duration of the power-on state is 1 µs, and the whole cycle of the PWM signal is 4 µs, the duty cycle is 0.25. The TACH signal contains rotation speed information of the fan 2.

The dial switch 30 is a switch used to adjust the duty cycle ratio. In the embodiment, the dial switch 30 has four states: 0000, 0001, 0010, and 0011, which respectively correspond to the duty cycle ratios of 10%, 20%, 30%, and 40%. The display unit 40 displays the duty cycle ratio of the PWM signal and the rotation speed information contained in the TACH signal to users. In this embodiment, the display unit 40 may be a light emitting diode (LED) display. The power supply unit 50 supplies power to the test board 1 and the fan 2.

Figure 2:
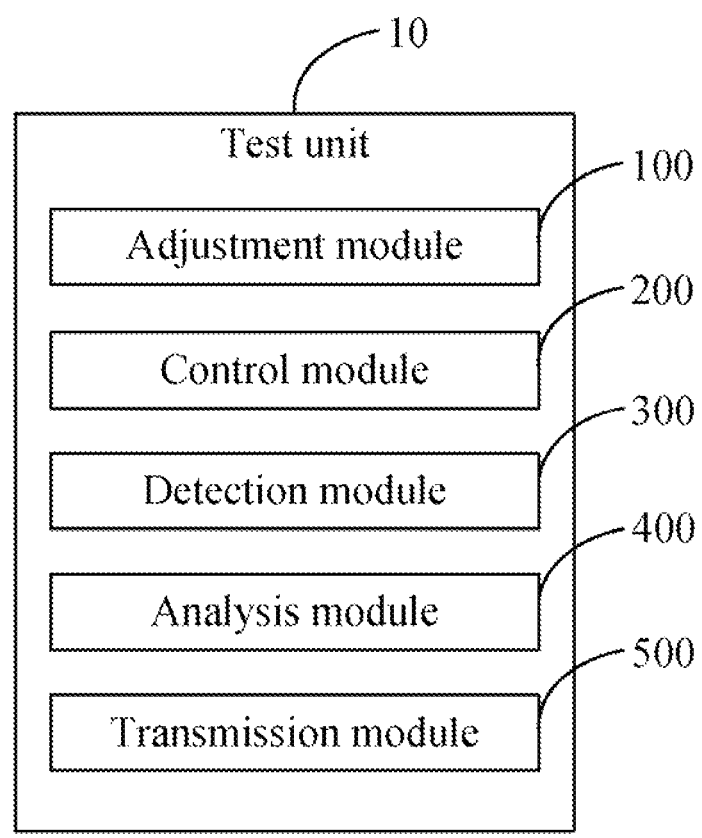
FIG. 2 is a block diagram of one embodiment of function modules of the test unit.

In one embodiment, the test unit 10 may include one or more function modules, a description is given in FIG. 2. The one or more function modules may comprise computerized code in the form of one or more programs that are stored in the storage unit 60, and executed by the processor 70 to provide the functions of the test unit 10. The storage unit 60 may be a cache or a dedicated memory, such as an erasable programmable read only memory (EPROM) or a flash memory.

FIG. 2 is a block diagram of one embodiment of the function modules of the test unit 10. In one embodiment, the test unit 10 includes an adjustment module 100, a control module 200, a detection module 300, an analysis module 400, and a transmission module 500. A detailed description of the functions of the modules 100-500 is given in FIG. 3.

Figure 3:
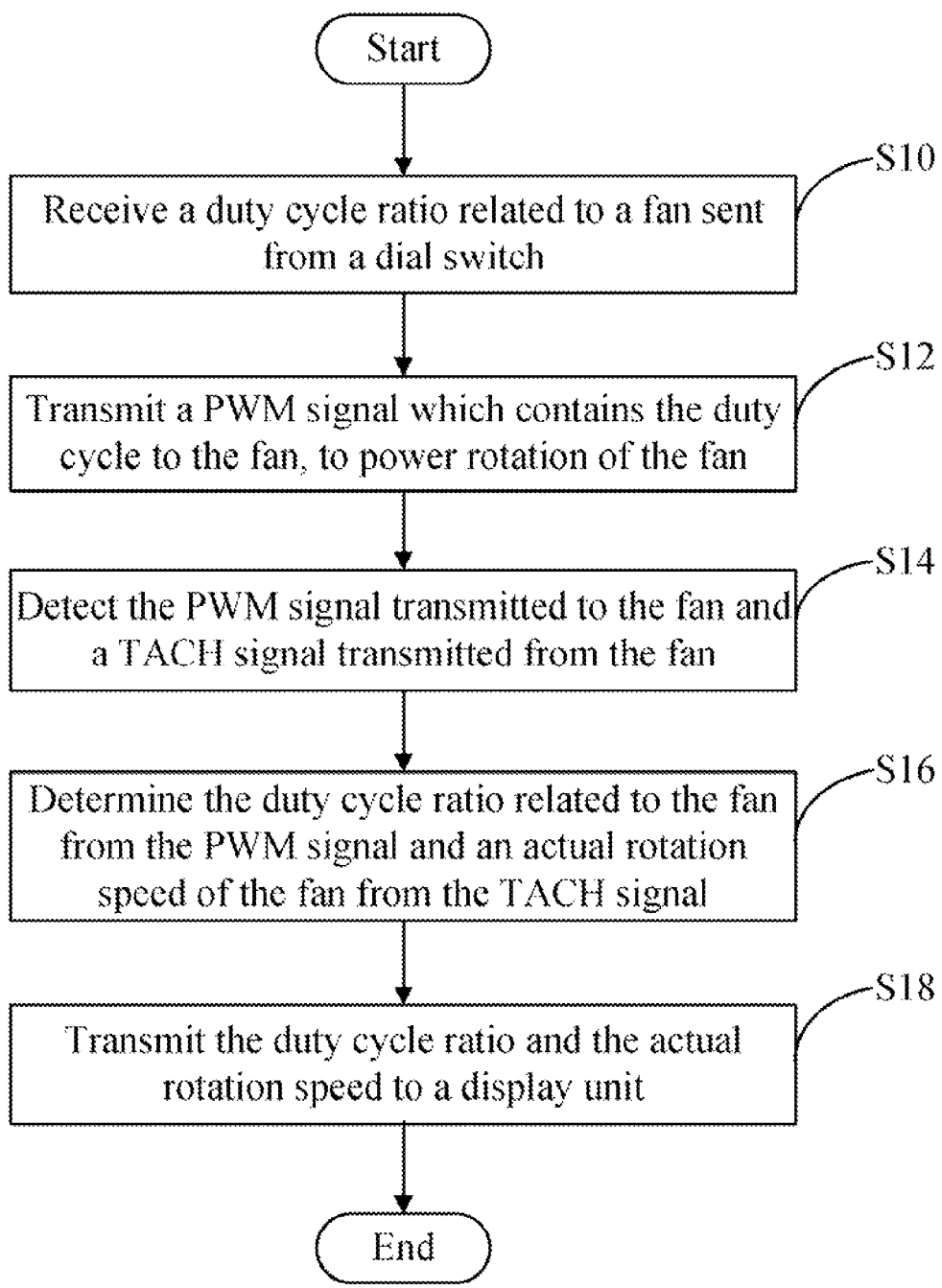
FIG. 3 is a flowchart of one embodiment of a method for testing rotation speed of a fan.

FIG. 3 is a flowchart of one embodiment of a method for testing rotation speed of a fan 2. Depending on the embodiment, additional steps may be added, others removed, and the ordering of the steps may be changed.

In step S10, the adjustment module 100 receives a duty cycle ratio related to the fan sent from the dial switch 30. In the embodiment, a user can adjust the duty cycle using the dial switch 30, and the dial switch 30 transmits the adjusted duty cycle to the adjustment module 100.

In step S12, the control module 200 transmits the PWM signal which contains the duty cycle to the fan 2, to power rotation of the fan 2.

In step S14, the detection module 300 detects the PWM signal transmitted to the fan 2 and the TACH signal transmitted from the fan 2.

In step S16, the analysis module 400 determines the duty cycle ratio related to the fan 2 from the PWM signal and an actual rotation speed of the fan 2 from the TACH signal.

In step S18, the transmission module 500 transmits the duty cycle ratio and the actual rotation speed to the display unit 40. The display unit 40 displays the duty cycle ratio and the actual rotation speed to users, so that the users can directly see a correlation between the duty cycle and the actual rotation speed on the test board 1.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A method for testing rotation speed of a fan using a test board, wherein the test board is electrically connected to the fan, the method being executed by a processor of the test board, the method comprising:
   (a) receiving by the processor of the test board a signal representing a duty cycle ratio related to the fan from a dial switch on the test board, the duty cycle ratio being a ratio of a duration of a power-on state relative to a whole cycle of a pulse width modulation (PWM) signal;

(b) transmitting the PWM signal comprising a duty cycle to the fan, to power rotation of the fan;
(c) detecting the PWM signal transmitted to the fan and a tachometer (TACH) signal transmitted from the fan using the processor;
(d) determining the duty cycle ratio related to the fan from the PWM signal and an actual rotation speed of the fan from the TACH signal; and
(e) transmitting signals comprising the determined duty cycle ratio and the determined actual rotation speed to a display unit on the test board.

2. The method as claimed in claim 1, wherein the duty cycle ratio is adjustable using the dial switch.

3. The method as claimed in claim 1, wherein the PWM signal and the TACH signal are transmitted via an interface unit on the test board.

4. The method as claimed in claim 1, wherein the display unit is a light emitting diode (LED) display.

5. A non-transitory storage medium storing a set of instructions, the set of instructions capable of being executed by a processor of a test board to perform a method for testing rotation speed of a fan connected to the test board, the method comprising:
(a) receiving by the processor of the test board a signal representing a duty cycle ratio related to the fan from a dial switch on the test board, the duty cycle ratio being a ratio of a duration of a power-on state relative to a whole cycle of a pulse width modulation (PWM) signal;
(b) transmitting the PWM signal comprising a duty cycle to the fan, to power rotation of the fan;
(c) detecting the PWM signal transmitted to the fan and a tachometer (TACH) signal transmitted from the fan using the processor;
(d) determining the duty cycle ratio related to the fan from the PWM signal and an actual rotation speed of the fan from the TACH signal; and
(e) transmitting signals comprising the determined duty cycle ratio and the determined actual rotation speed to a display unit on the test board.

6. The non-transitory storage medium as claimed in claim 5, wherein the duty cycle ratio is adjustable using the dial switch.

7. The non-transitory storage medium as claimed in claim 5, wherein the PWM signal and the TACH signal are transmitted via an interface unit on the test board.

8. The non-transitory storage medium as claimed in claim 5, wherein the display unit is a light emitting diode (LED) display.

9. A test board for testing a rotation speed of a fan, the test board being connected to the fan, the test board comprising:
a dial switch;
a display unit;
a storage unit;
at least one processor; and
one or more programs stored in the storage unit, which when executed by the at least one processor, execute the following modules stored in the storage unit:
an adjustment module that receives a signal representing a duty cycle ratio related to the fan from the dial switch, the duty cycle ratio being a ratio of a duration of a power-on state relative to a whole cycle of a pulse width modulation (PWM) signal;
a control module that transmits the PWM signal comprising a duty cycle to the fan, to power rotation of the fan;
a detection module that detects the PWM signal transmitted to the fan and a tachometer (TACH) signal transmitted from the fan;
an analysis module that determines the duty cycle ratio related to the fan from the PWM signal and an actual rotation speed of the fan from the TACH signal; and
a transmission module that transmits signals comprising the determined duty cycle ratio and the determined actual rotation speed of the fan to the display unit.

10. The test board as claimed in claim 9, wherein the duty cycle ratio is adjustable using the dial switch.

11. The test board as claimed in claim 9, wherein the test board further comprises an interface unit that connects the test board to the fan, and the PWM signal and the TACH signal are transmitted via the interface unit.

12. The test board as claimed in claim 9, wherein the display unit is a light emitting diode (LED) display.

* * * * *